United States Patent
Dong et al.

(10) Patent No.: US 10,629,154 B2
(45) Date of Patent: Apr. 21, 2020

(54) CIRCUIT FOR POWERING OFF A LIQUID CRYSTAL PANEL, PERIPHERAL DRIVE DEVICE AND LIQUID CRYSTAL PANEL

(71) Applicants: BOE TECHNOLOGY GROUP CO., LTD., Beijing (CN); BEIJING BOE DISPLAY TECHNOLOGY CO., LTD., Beijing (CN)

(72) Inventors: Dianzheng Dong, Beijing (CN); Bin Zhang, Beijing (CN); Qiang Zhang, Beijing (CN); Guangxing Wang, Beijing (CN); Kan Zhang, Beijing (CN); Yu He, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 59 days.

(21) Appl. No.: 15/531,170

(22) PCT Filed: Jun. 28, 2016

(86) PCT No.: PCT/CN2016/087448
§ 371 (c)(1),
(2) Date: May 26, 2017

(87) PCT Pub. No.: WO2017/152548
PCT Pub. Date: Sep. 14, 2017

(65) Prior Publication Data
US 2018/0047364 A1  Feb. 15, 2018

(30) Foreign Application Priority Data
Mar. 11, 2016  (CN) .......................... 2016 1 0137977

(51) Int. Cl.
*G09G 3/36* (2006.01)
*G02F 1/1343* (2006.01)
*G09G 3/34* (2006.01)

(52) U.S. Cl.
CPC ..... *G09G 3/3696* (2013.01); *G02F 1/134309* (2013.01); *G09G 3/3406* (2013.01);
(Continued)

(58) Field of Classification Search
CPC ............ G02F 1/134309; G09G 3/3696; G09G 3/3655; G09G 3/3406; G09G 3/3648;
(Continued)

(56) References Cited

U.S. PATENT DOCUMENTS 5,248,963 A * 9/1993 Yasui .................. G09G 3/3648
345/211
6,476,590 B2  5/2002 Chou
(Continued)

FOREIGN PATENT DOCUMENTS

CN  104361866  2/2015
CN  104849891  8/2015
(Continued)

OTHER PUBLICATIONS

Written Opinion of the International Search Report from corresponding PCT Application No. PCT/CN2016/087448 dated Dec. 14, 2016 (4 pages).
(Continued)

*Primary Examiner* — Christopher E Leiby
(74) *Attorney, Agent, or Firm* — Dave Law Group, LLC; Raj S. Dave

(57) ABSTRACT

A circuit for powering off a liquid crystal panel, a peripheral drive device, and a liquid crystal panel. In the circuit for powering off a liquid crystal panel, a switch module is coupled to an enable signal transmission line, a common
(Continued)

electrode and respective data lines of the liquid crystal panel, and is configured to be switched on upon receiving an enable signal, to connect the respective data lines to the common electrode. A peripheral drive device comprises: a reset signal generation module, a first, second and third control module, a data line drive module, a common electrode drive module, and a gate drive module. The reset signal generation module outputs a first reset signal when a driving voltage of a liquid crystal panel is less than a set value. The first control module outputs an enable signal in response to the first reset signal. The second control module drives the gate drive module to scan of gate lines for at least one frame in response to the first reset signal. The third control module, in response to the first reset signal, disconnects the common electrode drive module from the common electrode, disconnects the data line drive module from the data lines, and grounds the data lines and/or the common electrode. The embodiments of the present disclosure can efficiently reduce the start-up and power-off flicker drift of the liquid crystal panel.

20 Claims, 4 Drawing Sheets

(52) U.S. Cl.
CPC ......... *G09G 3/3648* (2013.01); *G09G 3/3655* (2013.01); *G09G 3/3677* (2013.01); *G09G 2320/0247* (2013.01); *G09G 2330/02* (2013.01); *G09G 2330/021* (2013.01); *G09G 2330/027* (2013.01)

(58) Field of Classification Search
CPC ............. G09G 3/3677; G09G 2330/02; G09G 2330/027; G09G 2330/021; G09G 2320/0247
See application file for complete search history.

(56) References Cited

U.S. PATENT DOCUMENTS

| 2004/0104908 | A1* | 6/2004 | Toyozawa | G09G 3/3648 345/211 |
|---|---|---|---|---|
| 2006/0262069 | A1* | 11/2006 | Do | G09G 3/3688 345/98 |
| 2008/0143662 | A1* | 6/2008 | Hong | G09G 3/3677 345/92 |
| 2011/0102405 | A1* | 5/2011 | Harada | G09G 3/3655 345/211 |
| 2016/0365056 | A1 | 12/2016 | Sun et al. | |

FOREIGN PATENT DOCUMENTS

| CN | 105185293 | 12/2015 |
|---|---|---|
| CN | 105679266 | 6/2016 |
| JP | 2011095622 | 5/2011 |
| KR | 20080064928 | 7/2008 |

OTHER PUBLICATIONS

Office Action from corresponding Chinese Application No. 201610137977.7 dated Sep. 1, 2017 (3 pages).
International Search Report from corresponding PCT Application No. PCT/CN2016/087448 dated Dec. 14, 2016 (2 pages).

* cited by examiner

CIRCUIT FOR POWERING OFF A LIQUID CRYSTAL PANEL, PERIPHERAL DRIVE DEVICE AND LIQUID CRYSTAL PANEL

CROSS-REFERENCE TO RELATED APPLICATION

This patent application claims priority of Chinese Patent Application No. 201610137977.7, filed on Mar. 11, 2016, the entire content of which is incorporated by reference herein.

BACKGROUND

Embodiments of the present disclosure relate to a circuit for powering off a liquid crystal pane, a peripheral drive device, and a liquid crystal panel comprising the circuit and the peripheral drive device.

A liquid crystal display panel typically comprises two substrates, a liquid crystal arranged between the two substrates, a backlight module and a peripheral drive module. Because of its small size, low energy consumption and other advantages, the liquid crystal display panel has become one of the most widely used display panels. In mobile phones, tablet computers, laptops, desktop computers, televisions and other products, liquid crystal display panels are occupying a very large market share. Therefore, there is a need to continuously improve the performance of the liquid crystal display panel.

SUMMARY

Embodiments of the present disclosure provide a circuit for powering off a liquid crystal pane, a peripheral drive device, and a liquid crystal panel comprising the circuit and the peripheral drive device, to effectively reduce start-up and power-off flicker shift of the liquid crystal panel, thereby improving the performance of the liquid crystal panel.

Specifically, according to an aspect of the present disclosure, there is provided a circuit for powering off a liquid crystal panel. The circuit comprises: an enable signal transmission line and a switch module. The switch module is coupled to the enable signal transmission line, a common electrode and respective data lines of the liquid crystal panel. The switch module can be switched on upon receiving an enable signal through the enable signal transmission line, to connect the respective data lines to the common electrode.

According to the above-described configuration, the respective data lines may be connected to the common electrode when an enable signal is applied to the circuit for powering off a liquid crystal panel. Since the respective data lines are connected to the common electrode, the respective data lines are also connected therebetween. In this way, the connection between the respective data lines and the common electrode may constitute a part of discharge paths for storage capacitors of respective pixels of the liquid crystal panel, thereby providing a part of the hardware basis for the formation of the discharge paths.

In an embodiment of the present disclosure, the switch module comprises at least one switch submodule. Each of the switch submodules comprises one transistor, wherein the gate of which is coupled to the enable signal transmission line, one electrode of which is coupled to one or more of the data lines, and the other electrode is coupled to the common electrode. In another aspect, each of the switch submodules comprises a plurality of transistors in series with source and drain connected, wherein the gate of each transistor is coupled to the enable signal transmission line, the source or drain of one of the two transistors at both ends of the plurality of transistors is coupled to the common electrode, and the drain or source of the other transistor is coupled to the one or more of the data lines.

According to the above configuration, the switch module may comprise one or more switch submodules, thereby flexibly realizing the manufacture of the switch module.

In an embodiment of the present disclosure, the transistor is a thin film transistor (TFT).

According to the above configuration, the switch module can be flexibly manufactured using a variety of existing film forming processes.

In an embodiment of the present disclosure, the circuit is arranged on an array substrate of the liquid crystal panel.

In an embodiment of the present disclosure, the circuit is arranged at the outside of an active area of the liquid crystal panel.

According to the above-described configuration, when the liquid crystal panel is a TFT liquid crystal panel and the switch module is implemented with the TFT, each layer of the switch module may be formed in the same patterning process with the same material as each corresponding layer of the driving TFT of each pixel in the active area of the array substrate, thereby greatly simplifying the manufacture of the switch module.

In an embodiment of the present disclosure, the circuit is arranged on a circuit board coupled to an array substrate of the liquid crystal panel.

According to the above-described configuration, only few modifications are required for the existing liquid crystal panel to realize the manufacture of the circuit.

According to another aspect of the present disclosure, there is also provided a peripheral drive device. The peripheral drive device comprises: a reset signal generation module, a first control module, a second control module, a third control module, a data line drive module, a common electrode drive module, and a gate drive module. The reset signal generation module is configured to output a first reset signal when a driving voltage of a liquid crystal panel is less than a set value. The first control module is configured to receive the first reset signal and output an enable signal in response to the first reset signal. The second control module is configured to receive the first reset signal and drive the gate drive module to scan gate lines for at least one frame in response to the first reset signal. The third control module is configured to receive the first reset signal, and, in response to the first reset signal, disconnect the common electrode drive module from the common electrode, disconnect the data line drive module from the data line, and ground the data lines and/or the common electrode.

According to the above configuration, since the common electrode drive module and the common electrode are disconnected and the data line drive module and the data lines are disconnected, it is possible to prevent the common electrode drive module and the data line drive module from introducing additional charge during the discharge of the liquid crystal panel. Further, since the data lines and/or the common electrode are grounded, it is possible to provide a ground path for a discharge path to release the charge to the ground, thereby providing hardware basis for the formation of the discharge path. In addition, it is also possible to provide a corresponding drive signal for the circuit and the gate lines. The enable signal functions as connecting the respective data lines with the common electrode when powering off the liquid crystal panel by applying the enable signal to the enable signal transmission line. Since the respective data lines are connected with the common electrode, the respective data lines are also connected therebetween. The signal for scanning the gate lines has the following effect that by using the scanning signal to scan each gate line, the storage capacitor of the respective pixels coupled to the gate line can be discharged to the ground synchronously through the connection between the respective data lines and the common electrode, so as to avoid the liquid crystal panel flashing during start-up after powering off for a period of time due to incomplete charge release.

Specifically, in the case where the data lines are grounded, since the respective data lines are grounded, the common electrode connected with the respective data lines are grounded, and the pixel electrodes (i.e., electrode plates of the storage capacitors of the respective pixels coupled to the respective data lines) are also grounded, so that the voltage on the common electrode, the voltage on the data lines, and the voltage on the pixel electrodes can be rapidly discharged synchronously with the same potential.

In a case where the common electrode is grounded, since the common electrode is grounded, the respective data lines connected with the common electrode are grounded, and the pixel electrodes (i.e., electrode plates of the storage capacitors of the respective pixels coupled to the respective data lines) are also grounded, so that the voltage on the common electrode, the voltage on the data lines, and the voltage on the pixel electrodes can be rapidly discharged synchronously with the same potential.

In an embodiment of the present disclosure, the third control module comprises a first switch unit and a second switch unit. A control electrode of the first switch unit is coupled to the reset signal generation module, one terminal of the first switch unit is coupled to the common electrode drive module and the other terminal is coupled to the common electrode. The first switch unit is configured to disconnect the common electrode drive module from the common electrode in response to the first reset signal. A control electrode of the second switch unit is coupled to the reset signal generation module, one terminal of the second switch unit is coupled to the data line drive module and the other terminal is coupled to the data line. The second switch unit is configured to disconnect the data line drive module from the data lines in response to the first reset signal.

In an embodiment of the present disclosure, the third control module comprises a grounding unit. The grounding unit is configured to ground the data lines and/or the common electrode in response to the first reset signal.

In an embodiment of the present disclosure, the reset signal generation module is configured to output a second reset signal when the driving voltage of the liquid crystal panel is greater than or equal to the set value.

In an embodiment of the present disclosure, the first switch unit is configured to connect the common electrode drive module to the common electrode in response to the second reset signal. The second switch unit is configured to connect the data line drive module to the data lines in response to the second reset signal.

In an embodiment of the present disclosure, the grounding unit is configured to disconnect the data lines and/or the common electrode from grounding in response to the second reset signal.

According to another aspect of the present disclosure, there is further provided a liquid crystal panel. The liquid crystal panel comprises: gate lines, data lines, a common electrode, which are arranged in an active display area; a circuit for powering off the liquid crystal panel as described above, and a peripheral drive device as described above. The first control module is coupled to the enable signal transmission line.

According to the above-described configuration, when the liquid crystal panel is powered off, by disconnecting the common electrode drive module from the common electrode and disconnecting the data line drive module from the data line, it is possible to prevent the common electrode drive module and the data line drive module from introducing additional charge during discharge of the liquid crystal panel. Also, by grounding the data line and/or the common electrode, it is possible to provide the discharge path with a ground path for discharging the charge to ground. In addition, by applying the enable signal to the enable signal transmission line, it is possible to connect respective data lines with the common electrode when powering off the liquid crystal panel. Since the respective data lines are connected with the common electrode, the respective data lines are also connected therebetween. In this way, when each gate line is scanned using the peripheral drive device, the storage capacitors of respective pixels coupled to said gate line can be discharged to the ground synchronously through the connection between the respective data lines and the common electrode, so as to avoid start-up flicker of the liquid crystal panel due to the incomplete release of the charge after a period of time after powering off.

BRIEF DESCRIPTION OF THE DRAWINGS

In order to illustrate the technical solution of the embodiments of the present disclosure more clearly, drawings of the embodiments will be briefly described below. Apparently, the schematic structural diagrams in the accompanying drawings are not necessarily drawn to scale, but rather features are presented in a simplified form. Moreover, the drawings in the following description are merely illustrative of some embodiments of the present disclosure and are not intended to limit the present disclosure.

DETAILED DESCRIPTION

To make the purpose, technical solutions, and advantages of the present disclosure more clear, embodiments of the present disclosure will be clearly and completely described below in conjunction with the drawings. Apparently, the described embodiments are part of embodiments of the present disclosure, instead of all the embodiments. Based on the described embodiments of the present disclosure, all other embodiments obtained by those skilled in the art without creative work also fall within the scope of protection sought for by the present disclosure.

In this context, the term "coupling" comprises direct and indirect connections between elements. The word "a plurality of" refers to two or more.

The existing liquid crystal panel is prone to start-up flicker after a period of time of powering off. This phenomenon is mainly caused due to the incomplete discharge of the liquid crystal panel during powering off, causing the charge left in the panel. In order to eliminate this phenomenon, there has been proposed an XAO (Output ALL-ON Control, i.e., XDON or XON) technology. An XAO signal is a control signal for a gate drive module. When the LCD panel is operating normally, the XAO signal remains at a high level. When the liquid crystal panel is powered off, so that the driving voltage of the liquid crystal panel is lower than a set value, the XAO signal goes from the high level to the low level. This may cause the gate drive module to forcibly change the signals on all gate lines (i.e., the scan lines) of the liquid crystal panel to a high level VGH, so that all driving transistors for driving the pixels are turned on, and the charge accumulated in the respective pixels is released. However, since all of the driving transistors are turned on at the same time, a large inrush current can be generated, thereby easily damaging the panel.

Embodiments of the present disclosure provide a circuit for powering off a liquid crystal panel (shorted as power-off circuit) and a peripheral drive device, and a liquid crystal panel comprising the power-off circuit and the peripheral drive device. According to the embodiments of the present disclosure, it is possible to ensure that the voltage on the pixel electrodes of respective pixels of the liquid crystal panel is completely released after powering off, thereby effectively reducing start-up and power-off flicker shift. Hereinafter, the power-off circuit, the peripheral drive device, and the liquid crystal panel of the present disclosure will be described in detail with reference to the corresponding embodiments.

I. Circuit for Powering Off a Liquid Crystal Panel

Figure 1:
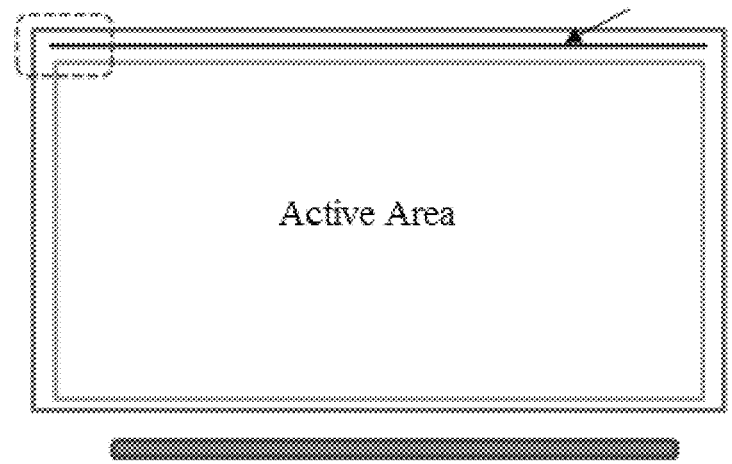
FIG. 1 is a schematic diagram showing the position of a circuit for powering off liquid crystal panel according to an embodiment of the present disclosure.

FIG. 1 is a schematic diagram showing the position of a power-off circuit according to an embodiment of the present disclosure. As described later with reference to FIGS. 2A to 2C, the circuit according to an embodiment of the present disclosure comprises an enable signal transmission line and a switch module. It should be noted, therefore, that only the enable signal transmission line is shown in FIG. 1, and the switch module is not shown for brevity. In an example shown in FIG. 1, the circuit is arranged at the outside of an active area (AA area) of the liquid crystal panel. The active area refers to an area of the liquid crystal panel capable of displaying an image, and typically comprises a plurality of liquid crystal pixels. In addition, although the liquid crystal panel of FIG. 1 is shown in the form of a television product, the present disclosure is not limited thereto. The liquid crystal panel according to the embodiment of the present disclosure can also be applied to other products such as mobile phones, tablet computers, notebook computers, desktop computers, and the like.

Figure 2A:
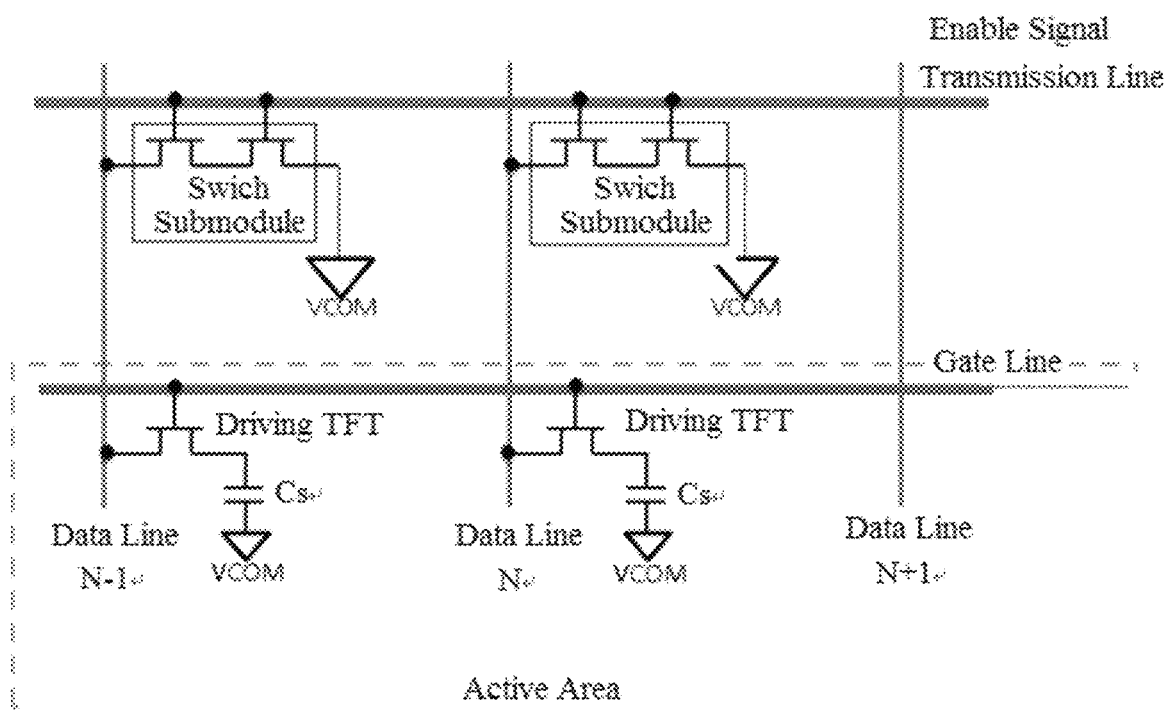
FIGS. 2A to 2C are schematic circuit diagrams of a circuit for powering off liquid crystal panel according to different embodiments of the present disclosure.
Figure 2B:
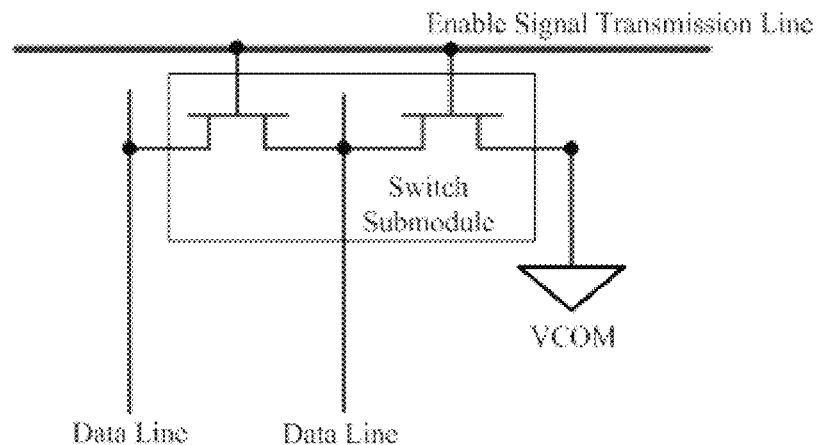
Figure 2C:
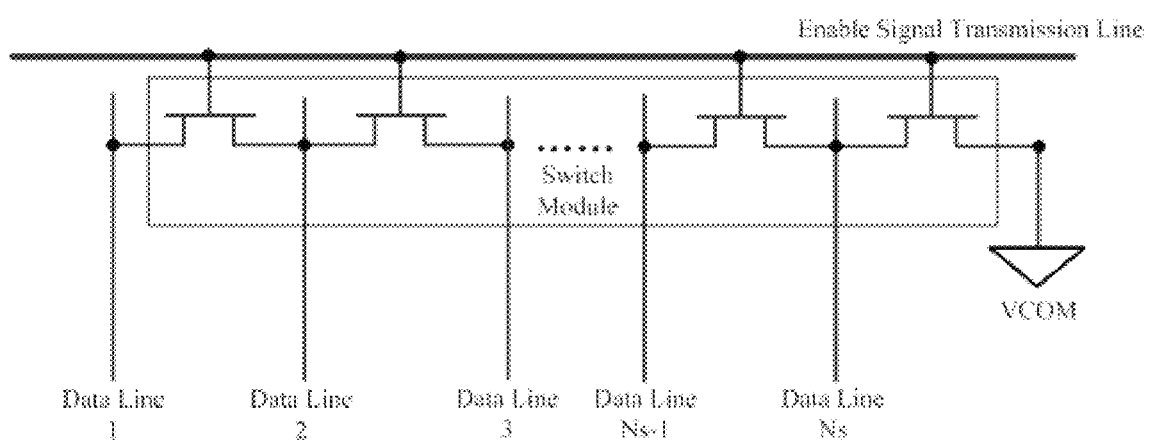

FIGS. 2A to 2C are schematic circuit diagrams of a power-off circuit according to different embodiments of the present disclosure. As shown in FIG. 2A, the active area of the liquid crystal panel comprises a plurality of gate lines (i.e., scan lines, only one gate line is shown in the figure for simplicity) and a plurality of data lines (i.e., source lines). In each rectangular area defined by a plurality of gate lines and a plurality of data lines, liquid crystal pixels are provided. Each of the liquid crystal pixels comprises a liquid crystal, a driving TFT (thin film transistor), and a holding capacitor (also referred as storage capacitor) Cs. The gate lines, the data lines, the driving TFTs, and the storage capacitors are arranged on an array substrate of the liquid crystal panel, and the liquid crystal is arranged between the array substrate and the color film substrate of the liquid crystal panel (specifically, between the pixel electrode on the array substrate and the common electrode on the color film substrate).

In the example shown in FIG. 2A, the storage capacitor Cs adopts the Cs On Common (that is, storage capacitor is arranged at the common electrode) architecture. That is, one electrode of the storage capacitor Cs, which is coupled to the driving TFT, is the pixel electrode, and the other electrode thereof is the common electrode. Thus, each gate line corresponds to one common electrode wiring. All common electrode wirings are coupled to VCOM (i.e., a module in the peripheral drive device of the liquid crystal panel, which is configured to provide a voltage signal for the common electrode). In practice, all common electrode wirings are typically coupled to the coupling terminal of the array substrate coupled to the VCOM module, which may refer to the "common electrode" described in the claims. As described above, the liquid crystal is arranged between the pixel electrode on the array substrate and the common electrode on the color film substrate. The common electrode on the color film substrate is also coupled to the VCOM. It should be noted that the two electrodes (i.e., the pixel electrode on the array substrate and the common electrode on the color film substrate) sandwiching the liquid crystal may also be regarded as equivalent to a capacitor Clc (i.e., liquid crystal capacitor), which is connected in parallel with the storage capacitor Cs, and is not shown in FIG. 2A for brevity.

When the liquid crystal panel operates normally, each gate line is sequentially driven by a signal, for example, at high level VGH, and all the driving TFTs on the gate line are turned on. The respective data lines store the data signal voltage onto the liquid crystal capacitor Clc and the storage capacitor Cs through the ON state driving TFTs, in synchronism with the gate line scanning. When scanning of the gate lines is finished, the driving TFT is turned off, and the recorded data signal voltage is stored and continuously drives the liquid crystal pixel until the next frame. It should be noted that although the liquid crystal panel shown in FIG. 2A is a TFT liquid crystal panel, it will be understood by those skilled in the art that the principles of the present disclosure can also be applied to any liquid crystal panel using an active drive mode (i.e., the driving elements of the respective pixels are not limited to the driving TFTs, but may be various other switching elements, such as various other driving transistors.)

As shown in FIGS. 2A to 2C, a power-off circuit according to an embodiment of the present disclosure comprises an enable signal transmission line and a switch module. The switch module is coupled to the enable signal transmission line, the common electrode and respective data lines of the liquid crystal panel. As mentioned above, the common electrode may be a coupling terminal on the array substrate coupled to the VCOM module. The switch module is configured to be switched on upon receiving an enable signal (for example, a signal at high level VGH) through the enable signal transmission line, to connect the respective data lines to the common electrode.

As an example, as shown in FIG. 2A, the switch module comprises a plurality of switch submodules. Each submodule is coupled to one data line of the active area, and comprises a pair of TFTs in series with source and drain connected. The gate of each TFT is coupled to the enable signal transmission line, the source or drain of one of the TFTs is coupled to a data line, and the other TFT is coupled to the common electrode. In this example, the enable signal transmission line and the respective gate lines in the active area of the array substrate may be formed in the same patterning process using the same material. In addition, since the switch module and the driving transistors of the respective pixels are implemented with TFTs, the respective layers of the switch module may be formed with the respective corresponding layers of the driving TFTs of the respective pixels in the active area of the array substrate in the same patterning process with the same material. It greatly simplifies the manufacture of the power-off circuit.

Thus, when the liquid crystal panel operates normally, a non-enable signal (for example, a signal at low level VGL) may be applied to the enable signal transmission line, or there is no signal applied to the enable signal transmission line. In either case, the switch module is switched off. With the dual-TFT structure, it is possible to effectively avoid the electric leakage of the data line to VCOM when the liquid crystal panel is operating. When the liquid crystal panel is powered off, with an enable signal (for example, a signal at high level VGH) being applied to the enable signal transmission line, it is possible to connect each data line of the active area to the common electrode. Since the respective data lines are connected with the common electrode, the respective data lines are also connected to each other. In this way, when each gate line of the active area is scanned using the peripheral drive device described below, the storage capacitors Cs of the respective pixels coupled to that gate line may be discharged to the ground synchronously through the connection lines between the respective data lines and the common electrode via the grounding path realized by the peripheral drive device described below. It then can avoid the start-up flicker after a period of time of powering off due to the incomplete release of the charge. Thus, it is only necessary to turn on one gate line (i.e., the enable signal transmission line) during power off, and to cooperate with the scanning of the respective gate lines of the active area to realize the discharge of the pixels. Since all the respective data lines are connected with the common electrode, a better discharge effect can be achieved. Further, as described above, the two electrodes of the liquid crystal capacitor Clc are the pixel electrode on the array substrate and the common electrode on the color film substrate. In general, the pixel electrode is connected to the coupling terminal of the liquid crystal panel coupling with the VCOM module (which may refer to the "common electrode" in the claims) via the data line, and the common electrode on the color film substrate is also coupled to the coupling terminal. Therefore, the two electrodes of the liquid crystal capacitor Clc can be discharged through the connection.

However, the present disclosure is not limited to the example shown in FIG. 2A. First of all, each switch submodule is not limited to the use of TFT, but also can be realized with existing types of transistors. With the switching function of the transistor, the switch module can also be realized using other types of electronic switches (e.g., diodes, nanoelectronic switches, etc.). In addition, the number of transistors is not limited to two, and it may be implemented by one transistor or more than two transistors in series.

In addition, the number of the enable signal transmission line is not limited to one, but may be two or more. In this way, the switch module can be divided into a plurality of parts with the same number as the enable signal transmission line. The plurality of parts are respectively coupled with one enable signal transmission line or with the plurality of enable signal transmission lines.

In addition, the power-off circuit may also be arranged at the active area of the array substrate. Further, the power-off circuit is not limited to being arranged on the array substrate, but may also be arranged on a circuit board (for example, a flexible circuit board) coupled to the array substrate. Thus, it can only perform few modifications on the existing liquid crystal panel to realize the manufacture of the power-off circuit.

FIG. 2B is a schematic circuit diagram of a power-off circuit according to another embodiment of the present disclosure. For brevity, the arrangement of the active area is not shown in FIG. 2B. The embodiment of FIG. 2B differs from the embodiment of FIG. 2A in that each switch submodule can be coupled to a plurality of data lines of the active area, and the configurations of the two in other aspects may be similar. As shown in FIG. 2B, a single switch submodule comprises two transistors in series with source and drain connected. The gate of each transistor is coupled to the enable signal transmission line. For the source and drain of both ends of the two transistors and one coupling point in the middle of a source-drain junction point, one of them (i.e., the rightmost source or drain) is coupled to the common electrode, and the remaining two terminals (i.e., one source-drain junction point in the middle and the leftmost source or drain) are coupled to one of the two data lines, respectively. Alternatively, the coupling point coupled to the common electrode is not limited to the source and the drain at both ends, but may also be one of the intermediate source-drain junction points. Alternatively, the single switch submodule may comprise three or more transistors in series with source and drain sequentially. In this way, at least one coupling point of the source and drain at the first and last ends of the three or more transistors and the intermediate source-drain junction point is coupled to the common electrode, and two of the remaining coupling points are respectively coupled to one of the two data lines. In this case, more than one transistor may be coupled between at least one pair of adjacent data lines, or more than one coupling point may be coupled to the common electrode. Similarly as the above, a single switch submodule can be coupled to three or more data lines and will not be described here.

FIG. 2C is a schematic circuit diagram of a power-off circuit according to another embodiment of the present disclosure. The embodiment of FIG. 2C differs from the embodiment of FIG. 2A in that the switch module comprises only one switch submodule and is coupled to respective data lines of the active area, but the configurations of the two in other respects are similar. As shown in FIG. 2C, the switch module comprises Ns transistors (Ns is the total number of respective data lines of the active area) in series with source and drain connected. The gate of each transistor is coupled to the enable signal transmission line. One coupling point among the source and drain at the first and last ends of the Ns transistors and the intermediate source-drain junction point (i.e., the rightmost source or drain) is coupled to the common electrode, and the remaining Ns coupling points are coupled to one of the respective data lines of the active area, respectively. Alternatively, the coupling point coupled to the common electrode is not limited to the source and the drain at both ends, but may also be one of the intermediate source-drain junction point. Alternatively, the switch module may comprise Ns or more transistors in series with source and drain connected. In this way, at least one coupling point among the source and the drain at the first and last ends of the Ns or more transistors and the intermediate source-drain junction point is coupled to the common electrode, and Ns of the remaining coupling points are respectively coupled to one of the Ns data lines. In this case, more than one transistor may be coupled between at least one pair of adjacent data lines, or more than one coupling point may be coupled to the common electrode.

In the above-described embodiment shown in FIGS. 2A to 2C, the source or drain of a single transistor is coupled to only one data line. However, the present disclosure is not limited thereto. The source or drain of a single transistor can also be coupled to multiple data lines. For example, in the case where the switch module comprises only one switch submodule, the switch module may comprise one transistor. The gate of which is coupled to the enable signal transmission line, one electrode of which is coupled to the respective data lines of the active area, and the other electrode is coupled to the common electrode. For other cases (e.g., one switch submodule comprises a plurality of transistors, or the switch module comprises a plurality of switch submodules and each switch submodule comprises one or more transistors), the source or drain of each transistor may be coupled to multiple data lines and will not be described here.

II. Peripheral Drive Device

Figure 3:
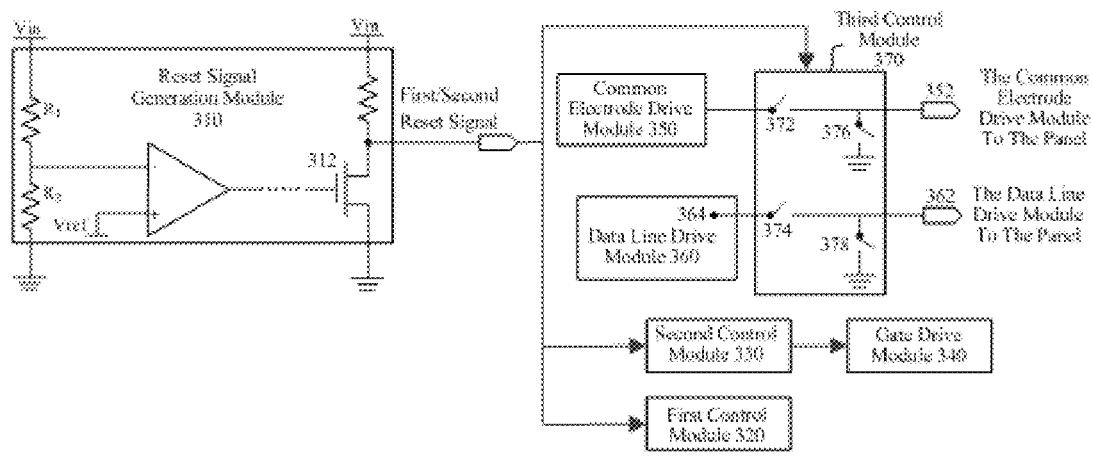
FIG. 3 is a schematic circuit diagram of a peripheral drive device according to an embodiment of the present disclosure.

FIG. 3 is a schematic circuit diagram of a peripheral drive device according to an embodiment of the present disclosure. The peripheral drive device is configured to work with the power-off circuit described above. As shown in the figure, the peripheral drive device according to an embodiment of the present disclosure may comprise a reset signal generation module 310, a first control module 320, a second control module 330, a gate drive module 340, a common electrode drive module 350, a data line drive module (or a source drive module) 360, and a third control module 370.

The reset signal generation module 310 may be configured to output a first reset signal when a driving voltage Vin of the liquid crystal panel is less than a set value. The first reset signal is an enable signal or a trigger signal that is configured to allow the peripheral drive device to perform a corresponding operation during powering off the liquid crystal panel. Alternatively, the reset signal generation module 310 may output a second reset signal when the driving voltage Vin of the liquid crystal panel is greater than or equal to the set value. That is, the second reset signal is output during normal operation of the liquid crystal panel.

As a first example, the first reset signal may be a phase-inverted signal of a portion of the above mentioned XAO signal during powering off the liquid crystal panel. Since the XAO signal is at a high level during normal operation of the liquid crystal panel, and is at a low level (e.g., zero level) during powering off the liquid crystal panel, the first reset signal is a signal at a high level during powering off the liquid crystal panel. Accordingly, the signal output terminal of the reset signal generation module 310 is at a zero level during normal operation of the liquid crystal panel. As shown in FIG. 3, the reset signal generation module 310 is implemented with a simple comparator circuit. The voltage applied to an inverting input terminal of the comparator is $Vin \cdot R_1/(R_1+R_2)$ and the voltage applied to a non-inverting input terminal is Vref. When $Vin \cdot R_1/(R_1+R_2)<Vref$, (i.e., $Vin<Vref \cdot (R_1+R_2)/R_1$), ($Vref \cdot (R_1+R_2)/R_1$ can be referred as the set values), the output voltage of the comparator is a positive voltage, thereby turning off the transistor 312 (e.g., a P-channel MOSFET (Metal Oxide Semiconductor Field Effect Transistor)). In this way, the signal output terminal of the reset signal generation module 310 is at a high level, thereby outputting a first reset signal of high level. When $Vin>Vref \cdot (R_1+R_2)/R_1$, the output voltage of the comparator is a negative voltage, thereby turning on the transistor 312. In this way, the signal output terminal of the reset signal generation module 310 is grounded, and therefore at a zero level.

As a second example, the second reset signal may be a portion of the above mentioned XAO signal when the liquid crystal panel is in normal operation (e.g., a portion where the XAO signal at a high level). This example can be achieved by replacing the P-channel MOSFET for the transistor 312 in the above-described first example with an N-channel MOSFET. Similar to the first example, when $Vin<Vref \cdot (R_1+R_2)/R_1$, the output voltage of the comparator is a positive voltage, thereby turning on the transistor 312 (e.g., N-channel MOSFET) is turned on. In this way, the signal output terminal of the reset signal generation module 310 is grounded, and therefore, is at a zero level (equivalent to that the first reset signal is at a zero level). When $Vin>Vref \cdot (R_1+R_2)/R_1$, the output voltage of the comparator is a negative voltage, thereby turning off the transistor 312. In this way, the signal output terminal of the reset signal generation module 310 is at a high level, thereby outputting a second reset signal of high level.

As a third example, the first reset signal may be a signal at a positive level, and the second reset signal may be a signal at a negative level. This example can be achieved by changing the grounded electrode of the transistor 312 in the first example to connect a negative reference voltage Similar to the first example, when $Vin<Vref \cdot (R_1+R_2)/R_1$, the signal output terminal of the reset signal generation module 310 is at a positive level, thereby outputting the first reset signal of positive level. When $Vin>Vref \cdot (R_1+R_2)/R_1$, the output voltage of the comparator is a negative voltage, thereby turning on the transistor 312. In this way, the signal output terminal of the reset signal generation module 310 is connected to a negative reference voltage, thereby outputting a second reset signal of negative level.

However, the present disclosure is not limited thereto. As mentioned above, the XAO signal is a known power-off control signal. Thus, the reset signal generation module 310 may be implemented with a technique similar to any existing XAO generation module (e.g., an XAO generation portion of an existing power control module). In addition, the first reset signal in the first example and the second reset signal in the second example may also be a negative level signal. In the third example, the first reset signal may be a negative level signal and the second reset signal may be a positive level signal.

The first control module 320 may be configured to receive the first reset signal and to output an enable signal in response to the first reset signal. The enable signal may be configured to drive the switch module of the power-off circuit. That is, the enable signal is a signal that can turn on a switch module coupled to the enable signal transmission line (for example, a signal having a high level VGH). The duration of the enable signal may be the time required to scan the gate lines of the active area of the liquid crystal panel for at least one frame. Since the switch module can remain off when no drive signal is received, the first control module 320 may not output any signal, during the period of not receiving the first reset signal (corresponding to the period of normal operation of the liquid crystal panel) or during the period of receiving the second reset signal (i.e., the period of normal operation of the liquid crystal panel). Alternatively, the first control module 320 may also output a non-enable signal during the period of not receiving the first reset signal (corresponding to the period of normal operation of the liquid crystal panel) or during the period of receiving the second reset signal (i.e., the period of normal operation of the liquid crystal panel). The non-enable signal is a signal (e.g., a signal at a low level VGL) that can turn off a switch module coupled to the enable signal transmission line.

As a simplest example, the first control module 320 may comprise a MOSFET. A gate of the MOSFET is coupled to the signal output terminal of the reset signal generation module 310, one electrode of the MOSFET is coupled to the enable signal transmission line and the other electrode is coupled to a reference voltage at an enable level (e.g., a high level VGH). The MOSFET can be set with reference to the following description of the first to fourth switch units. When the liquid crystal panel operates normally, the MOSFET is switched off, and when the liquid crystal panel is powered off, the MOSFET is switched on, thereby outputting the enable signal to the enable signal transmission line. However, the present disclosure is not limited thereto. The first control module 320 may be implemented by any existing technique for implementing gate driving. It can be implemented as an application specific integrated circuit (ASIC), field programmable gate array (FPGA), etc., and can also be implemented as a processor chip. As an example, the first control module 320 may be implemented by modifying the existing gate drive module.

The gate drive module 340 is configured to drive the respective gate lines of the active area of the liquid crystal panel and can be implemented by any existing gate driving technique (e.g., commercially available gate drive modules).

The second control module 330 may be configured to receive the first reset signal, and drive the gate drive module 340 to scan the gate line for at least one frame in response to the first reset signal. As a simplest example, the second control module 330 may drive the gate drive module 340 to sequentially scan all gate lines of the active area once. However, the present disclosure is not limited in terms of the scanning order of the gate lines as long as all the gate lines of the active area are scanned.

Similar to the first control module 320, the second control module 330 may comprise a MOSFET. A gate of the MOSFET is coupled to the signal output terminal of the reset signal generation module 310, one electrode of the MOSFET is coupled to the triggering terminal of the gate line scan signal of the gate drive module 340 and the other electrode is coupled to a reference voltage at a triggering level. When the liquid crystal panel operates normally, the MOSFET is switched off, and when the liquid crystal panel is powered off, the MOSFET is switched on, thereby triggering the output of the gate line scan signal. However, the present disclosure is not limited thereto. The second control module 330 may be implemented by any existing technique for implementing gate driving. It can be implemented as an application specific integrated circuit (ASIC), field programmable gate array (FPGA), etc., and can also be implemented as a processor chip. As an example, the second control module 330 may be implemented by modifying the existing gate drive module.

Thus, by applying the enable signal to the enable signal transmission line, it is possible to connect respective data lines of the active area with the common electrode when powering off the liquid crystal panel. Since the respective data lines are connected with the common electrode, the respective data lines are also connected therebetween. In this way, when each gate line of the active area is scanned using the second control module and the gate drive module, the storage capacitors of respective pixels coupled to the gate line can be discharged to the ground, synchronously through the connection lines between the respective data lines and the common electrode via for example the ground path implemented by the third control module described below. Therefore, it avoids the start-up flicker of the liquid crystal panel due to the incomplete release of the charge after a period of time after powering off.

The common electrode drive module (or VCOM module) 350 is a module configured to generate a voltage signal for a common electrode. It may be implemented with any existing (e.g., commercially available) VCOM module.

The data line drive module (or source drive module) 360 is configured to drive the respective data lines (or source lines) of the active area of the liquid crystal panel and may be implemented with any existing source driving technique (e.g., commercially available source drive module).

The third control module 370 may be configured to receive the first reset signal, and, in response to the first reset signal, to disconnect the common electrode drive module 350 from the common electrode, disconnect the data line drive module 360 from the data lines, and ground the data lines and/or the common electrode. As an example, as shown in FIG. 3, the third control module 370 comprises a first switch unit 372, a second switch unit 374, and a grounding unit.

The control electrode of the first switch unit 372 is coupled to the reset signal generation module 310, and one terminal of the first switch unit 372 is coupled to the common electrode drive module 350 and the other terminal is coupled to the common electrode. The first switch unit 372 is configured to disconnect the common electrode drive module 350 from the common electrode in response to the first reset signal.

In the case of the first example (the first reset signal is a positive level signal), as a simplest example, the first switch unit 372 may comprise a subtractor and a P-channel MOSFET. The output terminal of the subtractor outputs the result of the first reset signal minus a positive reference voltage (the value of which is less than the positive level of the first reset signal). The gate of the P-channel MOSFET is coupled to the output terminal of the subtractor, one electrode is coupled to the coupling terminal 352 of the common electrode drive module 350 coupling with the liquid crystal panel, and the other electrode is coupled to the signal output terminal of the common electrode drive module 350. Thus, when the first reset signal is not received (i.e., the liquid crystal panel is normally operating), the output signal of the subtractor is at a negative level and the P-channel MOSFET is switched on, and when the first reset signal is received (i.e., the liquid crystal panel is powered off), the output signal of the subtractor is at a positive level and the P-channel MOSFET is switched off to prevent the common electrode drive module 350 from introducing additional charge during discharge of the liquid crystal panel.

In the case of the above-described second example (the second reset signal is a positive level signal), the first switch unit 372 may comprise an N-channel MOSFET. A gate of the N-channel MOSFET is coupled to the output terminal of the second reset signal, one electrode of the N-channel MOSFET is coupled to the coupling terminal 352 and the other electrode is coupled to the signal output terminal of the common electrode drive module 350. Thus, when the second reset signal is received (i.e., the liquid crystal panel is normally operating), the N-channel MOSFET is switched on, and when the second reset signal is not received (i.e., the liquid crystal panel is powered off), the N-channel MOSFET is switched off to prevent the common electrode drive module 350 from introducing additional charge during discharge of the liquid crystal panel.

In the case of the third example (the first reset signal is a positive level signal and the second reset signal is a negative level signal), as a simplest example, the first switch unit 372 may comprise a P-channel MOSFET. A gate of the P-channel MOSFET is coupled to the output terminal of the first/second reset signal, one electrode of the P-channel MOSFET is coupled to the coupling terminal 352 and the other electrode is coupled to the signal output terminal of the common electrode drive module 350. Thus, when the second reset signal is received (i.e., the liquid crystal panel is normally operating), the P-channel MOSFET is switched on, and when the first reset signal is received (i.e., the liquid crystal panel is powered off), the P-channel MOSFET is switched off to prevent the common electrode drive module 350 from introducing additional charge during discharge of the liquid crystal panel.

The control electrode of the second switch unit 374 is coupled to the reset signal generation module 310, and one terminal of the second switch unit 374 is coupled to the data line drive module 360 and the other terminal of the second switch unit 374 is coupled to the data line. The second switch unit 374 is configured to disconnect the data line drive module 360 from the data line in response to the first reset signal.

Similar to the first switch unit 372, in the case of the above-described first example (the first reset signal is a positive level signal), as a simplest example, the second switch unit 374 may comprise a subtractor and a P-channel MOSFET. The output terminal of the subtractor outputs the result of the first reset signal minus a positive reference voltage (the value of which is less than the positive level of the first reset signal). The gate of the P-channel MOSFET is coupled to the output terminal of the subtractor, one electrode of the P-channel MOSFET is coupled to the coupling terminal 362 of the data line drive module 360 coupling with the liquid crystal panel, and the other electrode is coupled to the output terminal 364 of the data line driving signal. Thus, when the first reset signal is not received (i.e., the liquid crystal panel is normally operating), the output signal of the subtractor is at a negative level and the P-channel MOSFET is switched on, and when the first reset signal is received (i.e., the liquid crystal panel is powered off), the output signal of the subtractor is at a positive level and the P-channel MOSFET is powered off to prevent the data line drive module 350 from introducing additional charge during discharge of the liquid crystal panel.

In the case of the above-described second example (the second reset signal is a positive level signal), the second switch unit 374 may comprise an N-channel MOSFET. A gate of the N-channel MOSFET is coupled to the output terminal of the second reset signal, one electrode of the N-channel MOSFET is coupled to the coupling terminal 362 and the other electrode is coupled to the output terminal 364. Thus, when the second reset signal is received (i.e., the liquid crystal panel is normally operating), the N-channel MOSFET is switched on, and when the second reset signal is not received (i.e., the liquid crystal panel is powered off), the N-channel MOSFET is switched off to prevent the data line drive module 360 from introducing additional charge during discharge of the liquid crystal panel.

In the case of the above-described third example (the first reset signal is a positive level signal and the second reset signal is a negative level signal), as a simplest example, the second switch unit 374 may comprise a P-channel MOSFET. A gate of the P-channel MOSFET is coupled to the output terminal of the first/second reset signal, one electrode of the P-channel MOSFET is coupled to the coupling terminal 362 and the other electrode is coupled to the output terminal 364. Thus, when the first reset signal is received (i.e., the liquid crystal panel is normally operating), the P-channel MOSFET is switched on, and when the first reset signal is received (i.e., the liquid crystal panel is powered off), the P-channel MOSFET is switched off to prevent the data line drive module 360 from introducing additional charge during discharge of the liquid crystal panel.

The grounding unit is configured to ground the data lines and/or the common electrode in response to the first reset signal. As an example, as shown in FIG. 3, the grounding unit comprises at least one of the third switch unit 376 and the fourth switch unit 378.

In the case of the above-described first example (the first reset signal is a positive level signal), as a simplest example, the third switch unit 376 may comprise an N-channel MOSFET. A gate of the N-channel MOSFET is coupled to the output terminal of the first reset signal, one electrode of the N-channel MOSFET is coupled to the coupling terminal 352 of the common electrode drive module 350 coupling with the liquid crystal panel, the other electrode is coupled to a grounding terminal (for example, a grounding terminal arranged on a print circuit board (PCB) with the common electrode drive module). Thus, when the first reset signal is not received (i.e., the liquid crystal panel is normally operating), the N-channel MOSFET is switched off, and when the first reset signal is received (i.e., the liquid crystal panel is powered off), the N-channel MOSFET is switched on, to ground the coupling terminal 352.

In the case of the above-described second example (the second reset signal is a positive level signal), as a simplest example, the third switch unit 376 may comprise a subtractor and a P-channel MOSFET. The output terminal of the subtractor outputs the result of the second reset signal minus a positive reference voltage (the value of which is less than the positive level of the second reset signal). The gate of the P-channel MOSFET is coupled to the output terminal of the subtractor, one electrode of the P-channel MOSFET is coupled to the coupling terminal 352, and the other electrode is coupled to a grounding terminal (for example, a grounding terminal arranged on a PCB with the common electrode drive module). Thus, when the second reset signal is received (i.e., the liquid crystal panel is normally operating), the output signal of the subtractor is at a positive level and the P-channel MOSFET is switched off, and when the second reset signal is not received (i.e., the liquid crystal panel is powered off), the output signal of the subtractor is at a negative level and the P-channel MOSFET is switched on, to ground the coupling terminal 352.

In the case of the above-described third example (the first reset signal is a positive level signal and the second reset signal is a negative level signal), as a simplest example, the third switch unit 376 may comprise an N-channel MOSFET. A gate of the N-channel MOSFET is coupled to the output terminal of the first/second reset signal, one electrode of the N-channel MOSFET is coupled to the coupling terminal 352, the other electrode is coupled to a grounding terminal (for example, a grounding terminal arranged on a PCB with the common electrode drive module). Thus, when the second reset signal is received (i.e., the liquid crystal panel is normally operating), the N-channel MOSFET is switched off, and when the first reset signal is received (i.e., the liquid crystal panel is powered off), the N-channel MOSFET is switched on, to ground the coupling terminal 352.

Since the coupling terminal 352 of the common electrode drive module 350 is grounded, the common electrode coupled to the coupling terminal 352 is grounded, the respective data lines (i.e., the source lines) connected with the common electrode are also grounded, and the electrodes (i.e., pixel electrodes) of the storage capacitors that are connected with the respective data lines are also grounded. Therefore, the voltage on the common electrode, the voltage on the data lines, and the voltage on the pixel electrode can be synchronously discharged rapidly with the same potential via the ground path.

Similarly to the third switch unit 376, in the case of the above-described first example (the first reset signal is a positive level signal), as a simplest example, the fourth switch unit 378 may comprise an N-channel MOSFET. A gate of the N-channel MOSFET is coupled to the output terminal of the first reset signal, one electrode of the N-channel MOSFET is coupled to the coupling terminal 362 of the data line drive module 360 coupling with the liquid crystal panel, the other electrode is coupled to a grounding terminal (for example, a grounding terminal arranged on a PCB with the data line drive module). Thus, when the first reset signal is not received (i.e., the liquid crystal panel is normally operating), the N-channel MOSFET is switched off, and when the first reset signal is received (i.e., the liquid crystal panel is powered off), the N-channel MOSFET is switched on, to ground the coupling terminal 362.

In the case of the above-described second example (the second reset signal is a positive level signal), the fourth switch unit 378 may comprise a subtractor and a P-channel MOSFET. The output terminal of the subtractor outputs the result of the second reset signal minus a positive reference voltage (the value of which is less than the positive level of the second reset signal). The gate of the P-channel MOSFET is coupled to the output terminal of the subtractor, one electrode of the P-channel MOSFET is coupled to the coupling terminal 362, and the other electrode is coupled to a grounding terminal (for example, a grounding terminal arranged on a PCB with the data line drive module). Thus, when the second reset signal is received (i.e., the liquid crystal panel is normally operating), the output signal of the subtractor is at a positive level and the P-channel MOSFET is switched off, and when the second reset signal is not received (i.e., the liquid crystal panel is powered off), the output signal of the subtractor is at a negative level and the P-channel MOSFET is switched on, to ground the coupling terminal 362.

In the case of the above-described third example (the first reset signal is a positive level signal and the second reset signal is a negative level signal), as a simplest example, the fourth switch unit 378 may comprise an N-channel MOSFET. A gate of the N-channel MOSFET is coupled to the output terminal of the first/second reset signal, one electrode of the N-channel MOSFET is coupled to the coupling terminal 362, and the other electrode is coupled to a grounding terminal (for example, a grounding terminal arranged on a PCB with the data line drive module). Thus, when the second reset signal is received (i.e., the liquid crystal panel is normally operating), the N-channel MOSFET is switched off, and when the first reset signal is received (i.e., the liquid crystal panel is powered off), the N-channel MOSFET is switched on, to ground the coupling terminal 362.

Since the coupling terminal 362 of the data line drive module 360 is grounded, the respective data lines (i.e., the source lines) coupled to the coupling terminal 362 are also grounded, and the electrodes (i.e., pixel electrodes) of the storage capacitors that are connected with the data lines are also grounded, and the common electrode connected with the respective data lines is also grounded. Therefore, the voltage on the common electrode, the voltage on the data line, and the voltage on the pixel electrode can be synchronously discharged rapidly with the same potential via the grounding path.

It should be noted that FIG. 3 as a schematic diagram shows only one signal output terminal 364 of the data line drive module 360 and one switch unit 374 and one switch unit 378 corresponding thereto. In practice, the data line drive module actually comprises a plurality of signal output terminals 364, in order to drive the respective data lines (i.e., source lines) in the active area of the liquid crystal panel. Since each signal output terminal 364 corresponds to one switch unit 374 and one switch unit 378, the number of the switch unit 374 and the switch unit 378 are actually more than one. Further, the switch unit 374 and the switch unit 378 may be provided by modifying the existing data line drive module.

However, the present disclosure is not limited thereto. The first switch unit 372 and the second switch unit 374 may be implemented by any existing switch unit that can be switched off in response to a similar driving signal (e.g., from zero to a positive level, from a positive level to zero, from a negative level to a positive level, etc.). The third switch unit 376 and the fourth switch unit 378 may be implemented by any existing switch unit that can be switched off in response to a similar driving signal (e.g., from zero to a positive level, from a positive level to zero, from a negative level to a positive level, etc.). Similar to the power-off circuit, the switch units 372, 374, 376, and 378 may be implemented with other types of existing electronic switches (e.g., other types of transistors, diodes, nanoelectronic switches, etc.).

III. Timing Sequential for Powering Off a Liquid Crystal Panel

Figure 4:
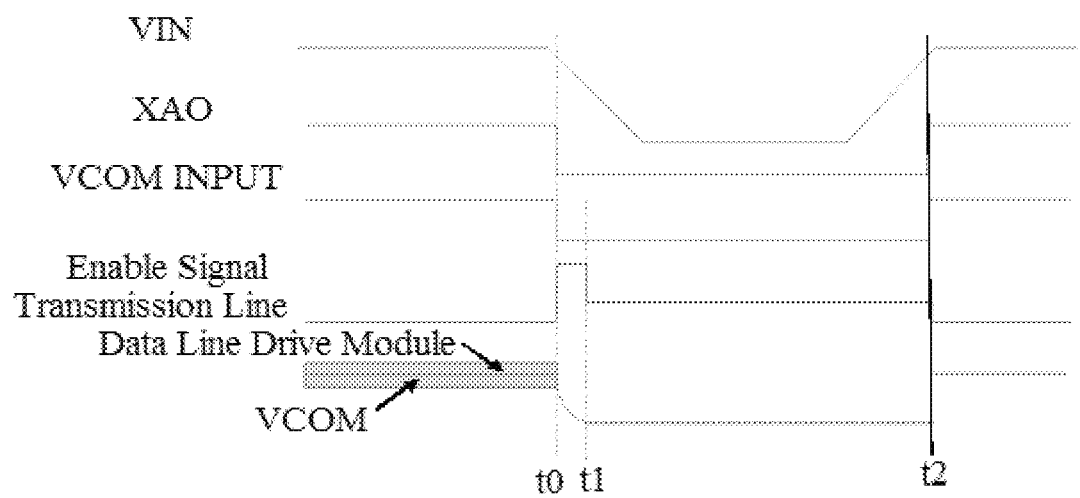
FIG. 4 is a schematic diagram illustrating a powering off timing sequence according to an embodiment of the present disclosure.
Figure 5:
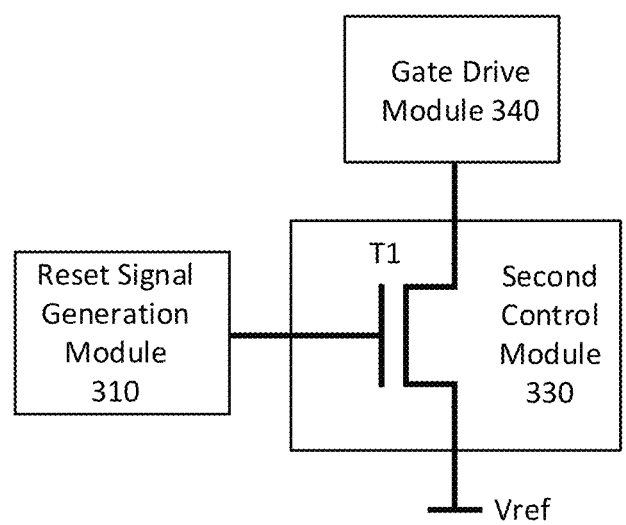
FIG. 5 is a schematic circuit diagram of a control module including a transistor, according to an example embodiment of the present disclosure.

FIG. 4 is a schematic diagram illustrating a timing sequential for powering off a liquid crystal panel according to an embodiment of the present disclosure, wherein the "VCOM input" represents a signal input from the VCOM module (or the common electrode drive module) 350 to the coupling terminal 352, and the "data line drive module" represents the signal at the coupling terminal 362 of the data line drive module 360 coupling with the liquid crystal panel, and the "VCOM" represents the signal at the coupling terminal 352 of the VCOM module 350 coupling with the liquid crystal panel. This embodiment corresponds to the above-described second example, that is, the second reset signal is a portion of the XAO signal when the liquid crystal panel is in normal operation (for example, the portion where the XAO signal is at a high level). Also, in this embodiment, the peripheral drive device comprises only the fourth switch unit 378 and does not comprise the third switch unit 376. In addition, the enable signal applied to the enable signal transmission line is a signal at a high level VGH.

As shown in the figure, when the liquid crystal panel is operating normally, the panel driving voltage VIN remains at a high level. Accordingly, the XAO signal also remains a high level. In this way, the enable signal transmission line remains at a low level VGL (for example, −8V), and the switch module of the power-off circuit is switched off. Since the first switch unit 372 is switched on, the VCOM input remains at a high level. Accordingly, the signal at the coupling terminal of the VCOM module coupling with the liquid crystal panel remains at a high level, and a rectangle in FIG. 4 representing the signal means that the signal is a time-varying signal. In this way, since the second switch unit 374 is switched on and the fourth switch unit 378 is switched off, the signal at the coupling terminal of the data line drive module coupling with the liquid crystal panel also remains at a high level. Likewise, a rectangle representing the signal means that the signal is a time-varying signal.

When the liquid crystal panel is powered off, the panel driving voltage VIN drops. At time $t_0$, when the VIN is less than the set value, the XAO signal is pulled down from the high level to the low level (for example, zero level). Accordingly, the signal voltage on the enable signal transmission line is pulled up from the low level VGL for operation to the high level VGH, to turn on the switch module coupled thereto, so that the respective data lines are connected with the common electrode and the respective data lines are connected therebetween. In addition, since the first switch unit 372 is switched off, the VCOM input goes low. Accordingly, since the third control module 370 disconnects the data line drive module 360 from the data lines in response to the XAO signal becoming low, and grounds the data lines so that the liquid crystal panel is discharged. Therefore, the signal at the coupling terminal of the data line drive module coupling with the liquid crystal panel gradually decreases from the time $t_0$ to the low level, and the signal at the coupling terminal of the VCOM module coupling with the liquid crystal panel also gradually decreases from the time $t_0$ to the low level.

Between $t_0$ and $t_1$, the second control module scans of the gate lines of the active area for at least one frame, and the voltage on the common electrode, the voltage on the data lines, and the voltage on the pixel electrode are synchronously discharged to the ground (GND) via the data lines, to complete discharge the panel. At timing $t_1$, the scanning of the gate line is completed, the signal voltage on the enable signal transmission line becomes, for example, 0 volts, and the liquid crystal panel is in the power-off state.

After a period of time, when the liquid crystal panel is powered on, the panel driving voltage VIN gradually increases. When VIN is higher than the set value, the XAO signal goes high, the signal on the enable signal transmission line is pulled down from 0 V at power-off period to the low level VGL at operation. Accordingly, the VCOM input becomes a high level and the signal at the coupling terminal of the VCOM module coupling with the liquid crystal panel changes from a low level to a high level. The signal at the coupling terminal of the data line drive module coupling with the liquid crystal panel also becomes a high level.

IV. Liquid Crystal Panel

According to the above description, a liquid crystal panel comprising a circuit for powering off the liquid crystal panel and a peripheral drive device according to embodiments of the present disclosure (wherein the first control module is coupled with the enable signal transmission line) can effectively reduce the start-up and power-off flicker drift, and details will not be repeated herein.

It is to be noted that the above description is merely an exemplary embodiment of the present disclosure and is not intended to limit the scope of protection sought for by the present disclosure, and that the scope of protection sought for by the present disclosure is defined by the appended claims.

The invention claimed is:

1. A peripheral drive device, comprising:
   a reset signal generation module;
   a first control module;
   a second control module;
   a third control module;
   a data line drive module;
   a common electrode drive module; and
   a gate drive module; wherein:
   the reset signal generation module is configured to output a first reset signal when a driving voltage of a liquid crystal panel is less than a set value;
   the first control module is configured to receive the first reset signal and to output an enable signal in response to receiving the first reset signal;
   the second control module is configured to receive the first reset signal and to drive the gate drive module to scan gate lines for at least one frame in response to receiving the first reset signal, wherein the second control module only comprises a first transistor, a gate of the first transistor is coupled to a signal output terminal of the reset signal generation module to receive the first reset signal, a first electrode of the first transistor is coupled to a triggering terminal of a gate line scan signal of the gate drive module to receive the first reset signal, and a second electrode of the first transistor is coupled to a reference voltage at a triggering level;
   the gate drive module is configured to output the gate line scan signal to a scan line based on a trigger signal; and
   the third control module is configured to receive the first reset signal, and, in response to receiving the first reset signal, to disconnect the common electrode drive module from a common electrode, disconnect the data line drive module from data lines, and ground the data lines and/or the common electrode.

2. The peripheral drive device according to claim 1, wherein:
   the third control module comprises a first switch unit and a second switch unit;
   a control electrode of the first switch unit is coupled to the reset signal generation module, one terminal of the first switch unit is coupled to the common electrode drive module and another terminal of the first switch unit is coupled to the common electrode;
   the first switch unit is configured to disconnect the common electrode drive module from the common electrode in response to receiving the first reset signal;
   a control electrode of the second switch unit is coupled to the reset signal generation module, one terminal of the second switch unit is coupled to the data line drive module and another terminal of the first switch unit is coupled to the data lines; and
   the second switch unit is configured to disconnect the data line drive module from the data lines in response to receiving the first reset signal.

3. The peripheral drive device according to claim 2, wherein:
   the third control module comprises a grounding unit; and
   the grounding unit is configured to ground the data lines and/or the common electrode in response to receiving the first reset signal.

4. The peripheral drive device according to claim 2, wherein the reset signal generation module is configured to output a second reset signal when the driving voltage of the liquid crystal panel is greater than or equal to the set value.

5. The peripheral drive device according to claim 1, wherein:
   the third control module comprises a grounding unit; and
   the grounding unit is configured to ground the data lines and/or the common electrode in response to receiving the first reset signal.

6. The peripheral drive device according to claim 2, wherein the reset signal generation module is configured to output a second reset signal when the driving voltage of the liquid crystal panel is greater than or equal to the set value.

7. The peripheral drive device according to claim 6, wherein a grounding unit is configured to disconnect the data lines and/or the common electrode from the grounding in response to receiving the second reset signal.

8. The peripheral drive device according to claim 7, wherein:
the first switch unit is configured to connect the common electrode drive module to the common electrode in response to receiving the second reset signal; and
the second switch unit is configured to connect the data line drive module to the data lines in response to receiving the second reset signal.

9. A liquid crystal panel comprising:
gate lines, data lines, and a common electrode, which are arranged in an active display area;
a circuit for powering off the liquid crystal panel, the circuit comprising an enable signal transmission line and a switch module, wherein the switch module is coupled to the enable signal transmission line, a common electrode and respective data lines of the liquid crystal panel, and the switch module is configured to switch on in response to receiving an enable signal through the enable signal transmission line, to connect the respective data lines to the common electrode, wherein the data lines intersect the gate lines of the liquid crystal panel to define pixels of the liquid crystal panel; and
a peripheral drive device according to claim 1; wherein the first control module is coupled to the enable signal transmission line.

10. The liquid crystal panel according to claim 9, wherein:
the switch module comprises a switch submodule;
wherein the switch submodules comprises one transistor, a gate of a transistor is coupled to the enable signal transmission line, one electrode of the transistor is coupled to one or more of the data lines, and another electrode of the transistor is coupled to the common electrode; or
wherein the switch submodules comprises a plurality of transistors in series with sources and drains connected to one another, the gate of each transistor is coupled to the enable signal transmission line, a source or a drain of a first transistor at both ends of the plurality of transistors is coupled to the common electrode, and a drain or a source of a second transistor at both ends of the plurality of transistors is coupled to the one or more of the data lines.

11. The liquid crystal panel according to claim 9, wherein the circuit is arranged on an array substrate of the liquid crystal panel.

12. The liquid crystal panel according to claim 11, wherein the circuit is arranged at the outside of an active area of the liquid crystal panel.

13. The liquid crystal panel according to claim 9, wherein:
the third control module comprises a first switch unit and a second switch unit;
a control electrode of the first switch unit is coupled to the reset signal generation module, one terminal of the first switch unit is coupled to the common electrode drive module and another terminal of the first switch unit is coupled to the common electrode;
the first switch unit is configured to disconnect the common electrode drive module from the common electrode in response to receiving the first reset signal;
a control electrode of the second switch unit is coupled to the reset signal generation module, one terminal of the second switch unit is coupled to the data line drive module and another terminal of the first switch unit is coupled to the data lines; and
the second switch unit is configured to disconnect the data line drive module from the data lines in response to receiving the first reset signal.

14. The liquid crystal panel according to claim 13, wherein the third control module comprises a grounding unit; and
the grounding unit is configured to ground the data lines and/or the common electrode in response to receiving the first reset signal.

15. The liquid crystal panel according to claim 14, wherein the reset signal generation module is configured to output a second reset signal when the driving voltage of the liquid crystal panel is greater than or equal to the set value.

16. The liquid crystal panel according to claim 15, wherein:
the first switch unit is configured to connect the common electrode drive module to the common electrode in response to receiving the second reset signal; and
the second switch unit is configured to connect the data line drive module to the data lines in response to receiving the second reset signal.

17. The liquid crystal panel according to claim 16, wherein the grounding unit is configured to disconnect the data lines and/or the common electrode from the grounding in response to receiving the second reset signal.

18. A method of powering off the liquid crystal panel according to claim 9, the method comprising:
between a time t0 and a time t1, wherein the time t1 is subsequent to the time t0, the reset signal generation module outputting the first reset signal when the driving voltage of the liquid crystal panel is less than the set value, the first control module outputting the enable signal on the enable signal transmission line in response to receiving the first reset signal, the second control module driving the gate drive module to scan the gate lines for the at least one frame in response to receiving the first reset signal, and the third control module disconnecting the common electrode drive module from the common electrode, disconnecting the data line drive module from the data lines, and grounding the respective data lines and/or the common electrode;
at the time t1, completing the scanning of the gate lines; and
between the time t1 and a time t2, wherein the time t2 is subsequent to the time t1, outputting zero volts on the enable signal transmission line, with the liquid crystal panel in a power-off state.

19. The method according to claim 18, wherein the second control module driving the gate drive module to scan the gate lines for the at least one frame in response to receiving the first reset signal comprises driving the gate drive module to sequentially scan all gate lines of an active area once.

20. The liquid crystal panel according to claim 9, wherein the second control module is further configured to drive the gate drive module to sequentially scan all gate lines of an active area once.

* * * * *